United States Patent
Huennekens et al.

(10) Patent No.: US 9,211,932 B1
(45) Date of Patent: Dec. 15, 2015

(54) SELF-PROPELLED UNICYCLE ENGAGABLE WITH VEHICLE

(71) Applicant: Ford Global Technologies, LLC, Dearborn, MI (US)

(72) Inventors: Johannes Huennekens, Ocean Grove (AU); Samuel Ellis, Herne Hill (AU); Greg Foletta, Anakie (AU); Lauri Mikael Ohra-aho, Lara (AU)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/297,536

(22) Filed: Jun. 5, 2014

(51) Int. Cl.
| | |
|---|---|
| *B60R 9/10* | (2006.01) |
| *B62K 13/00* | (2006.01) |
| *B62K 1/00* | (2006.01) |
| *B62K 11/00* | (2006.01) |
| *B62K 17/00* | (2006.01) |
| *B60B 19/02* | (2006.01) |

(52) U.S. Cl.
CPC . *B62K 1/00* (2013.01); *B60B 19/02* (2013.01); *B60R 9/10* (2013.01); *B62K 11/00* (2013.01); *B62K 13/00* (2013.01); *B62K 17/00* (2013.01); *B60B 2900/351* (2013.01)

(58) Field of Classification Search
CPC .... B62K 13/00; B62K 1/00; B60B 2900/351; B60B 9/10

USPC .......... 180/21, 11, 209, 198, 15, 16
See application file for complete search history.

(56) References Cited

U.S. PATENT DOCUMENTS

| | | | | | |
|---|---|---|---|---|---|
| 3,513,924 | A | * | 5/1970 | Jackson | 180/14.1 |
| 4,413,692 | A | * | 11/1983 | Clifft | 180/11 |
| 6,290,014 | B1 | * | 9/2001 | MacCready, Jr. | 180/205.1 |
| 6,341,658 | B1 | | 1/2002 | Rosenwald | |
| 6,979,013 | B2 | | 12/2005 | Chen | |
| 8,177,011 | B2 | * | 5/2012 | Fletcher | 180/209 |
| 2003/0070855 | A1 | * | 4/2003 | Horii et al. | 180/208 |
| 2006/0000664 | A1 | * | 1/2006 | Huang et al. | 180/907 |
| 2007/0029747 | A1 | * | 2/2007 | Islo et al. | 280/47.35 |
| 2011/0220427 | A1 | * | 9/2011 | Chen | 180/21 |
| 2012/0217072 | A1 | * | 8/2012 | Hoffmann et al. | 180/21 |

FOREIGN PATENT DOCUMENTS

| | | |
|---|---|---|
| CN | 2825435 Y | 10/2006 |
| EP | 2176117 B1 | 3/2011 |
| JP | 2005119349 | 5/2005 |

* cited by examiner

*Primary Examiner* — Ruth Ilan
(74) *Attorney, Agent, or Firm* — Frank A. MacKenzie; Bejin Bieneman PLC (57) ABSTRACT

A self-propelled unicycle is selectively engaged with a vehicle for use with the vehicle and is selectively disengaged with the vehicle for independent use. The self-propelled unicycle includes a hub and a wheel rotatably coupled to the hub. A motor is supported on the hub and is coupled to the wheel for rotating the wheel relative to the hub. The hub including an engagement feature for selectively engaging and disengaging the vehicle.

20 Claims, 8 Drawing Sheets

SELF-PROPELLED UNICYCLE ENGAGABLE WITH VEHICLE

BACKGROUND

Vehicles such as automobiles may be used to transport other modes of transportation, such as bicycles, for example. The vehicle may be used to transport the bicycle, for example, for recreational use of the bicycle. As another example, the vehicle may be used to transport the bicycle so that the vehicle and the bicycle provide multi-modal transportation. Multi-modal transportation can include driving the vehicle to a location at which the vehicle may be parked and then driving the bicycle from the vehicle to a final destination. For example, a driver may travel to a work office located in an urban setting congested by commuters by first driving the vehicle to a less congested satellite parking lot remote from the office and driving the bicycle from the vehicle to the office. The bicycle may be more easily and quickly maneuvered in the more congested areas.

Packaging bicycles in or on a vehicle during transportation creates difficulties, especially with relatively small vehicles. An interior of a vehicle may be reconfigurable, e.g., seats may be folded, to accommodate a bicycle in the interior of the vehicle. However, the bicycle disadvantageously consumes valuable interior space of the vehicle and can disadvantageously move within the vehicle during unexpected acceleration or deceleration.

Bicycles can alternatively be stored on an exterior of a vehicle during transportation. For example, after-market racks are available for mounting to vehicles and supporting one or more bicycles. However, these after-market racks are expensive to purchase. Assembly of the after-market rack to the vehicle and assembly of the bicycle onto the rack is also disadvantageously time consuming. The rack and the bicycle also disrupts airflow around the vehicle during travel, thereby disadvantageously decreasing fuel economy of the vehicle.

Accordingly, there remains an opportunity to design a device for multi-modal transportation that is easily and compactly integrated with the vehicle.

DETAILED DESCRIPTION

With reference to the Figures, wherein like numerals indicate like parts throughout the several views, a multi-modal transportation system 10 includes a suspension system 12 for a vehicle 16 and a self-propelled unicycle 14. The self-propelled unicycle 14 selectively engages the suspension system 12 for use with the vehicle 16 and selectively disengages from the suspension system 12 for independent use. The self-propelled unicycle 14 includes a hub 18, a wheel 20 rotatably coupled to the hub 18, and a motor 22 coupled to the hub 18 and the wheel 20 for rotating the wheel 20. The hub 18 includes an engagement feature 24 for selectively engaging the suspension system 12.

A driver of the vehicle 16 may drive the vehicle 16, with the self-propelled unicycle 14 engaged with the suspension system 12, to a selected location and park the vehicle 16 at the selected location. The driver may then disengage the self-propelled unicycle 14 from the suspension system 12 and drive the self-propelled unicycle 14 to a different destination. In other words, the driver uses the vehicle 16 and the self-propelled unicycle 14 as multi-modal transportation. As one example of this use, the driver may travel to a work office located in an urban setting congested by commuters by first driving the vehicle 16 to a satellite parking lot in a less congested location spaced from the office and then driving the self-propelled unicycle 14 from the vehicle 16 to the office. The self-propelled unicycle 14 may be more easily and quickly maneuvered in the more congested areas.

The self-propelled unicycle 14 may take the place of a wheel of the vehicle 16. In other words, the vehicle 16 typically includes four wheels, and the self-propelled unicycle 14 can be engaged with the suspension system 12 in the place of one of the wheels. The self-propelled unicycle 14 operates as a corner unit of the vehicle 16. As set forth further below, the multi-modal transportation system 10 may include more than one self-propelled unicycle 14 engaged with the suspension system 12 of the vehicle 16. In other words, one or more wheels of the vehicle 16 may be replaced with self-propelled unicycles 14, respectively. Since the self-propelled unicycle 14 is connected to the suspension system 12, the self-propelled unicycle 14 is easily and compactly integrated with the vehicle 16 and is transported with the vehicle 16 without consuming interior space of the vehicle 16. The removal of the self-propelled unicycle 14 from the vehicle 16 operates as an anti-theft feature since the vehicle 16 may not be operated when the self-propelled unicycle 14 is disengaged from the suspension system 12.

It should be appreciated that the vehicle 16 may be of any type, such as, for example, any type of automobile. As another example, the vehicle 16 may be a golf cart.

The suspension system 12 may be of any suitable type that supports the vehicle 16 on the self-propelled unicycle 14. For example, the suspension system 12 may be a front suspension system or a rear suspension system and may be any type of dependent suspension systems or independent suspension systems including a MacPherson strut system, a double wishbone system, trailing-arm system, etc. The self-propelled unicycle 14 may be engaged to a steering system of the vehicle 16. Alternatively, the self-propelled unicycle 14 may be engaged with a non-steering suspension system.

The vehicle 16 may be retrofitted to engage the self-propelled unicycle 14. For example, relevant components of a suspension system of a factory-made vehicle 16 may be retrofitted after purchase from the vehicle 16 manufacturer to engage the self-propelled unicycle 14.

Figure 3:
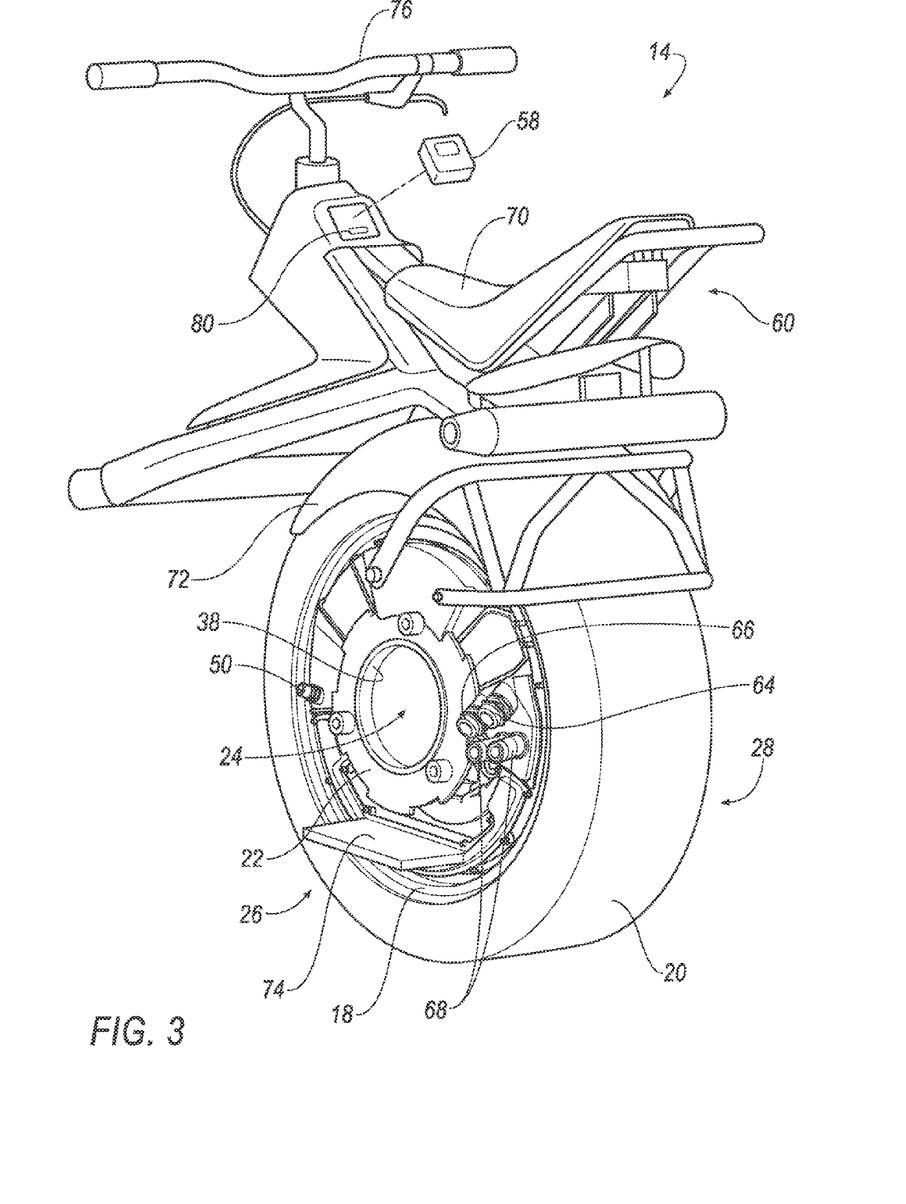
FIG. 3 is a perspective view of the self-propelled unicycle.
Figure 4:
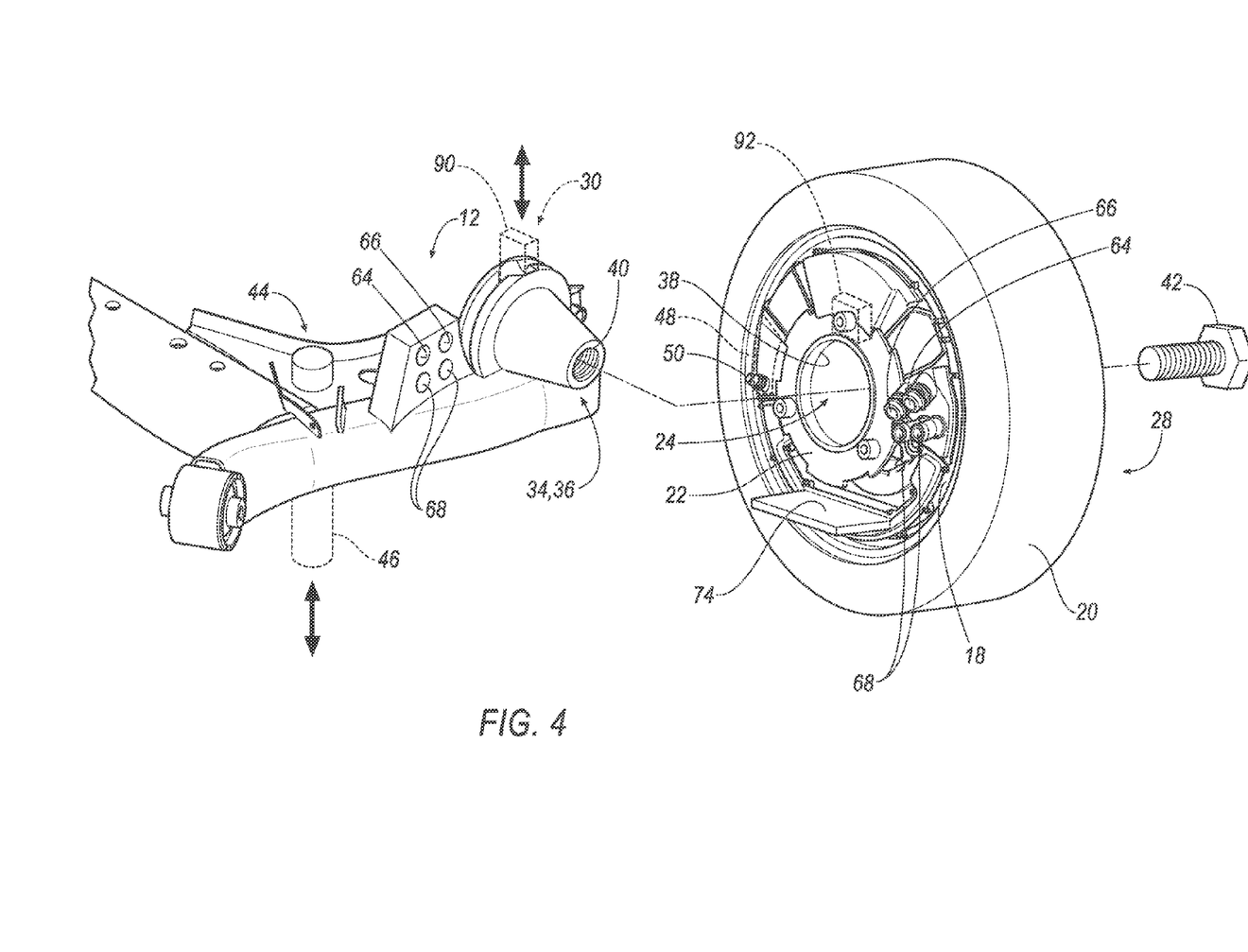
FIG. 4 is an exploded view of the self-propelled unicycle and the suspension system.
Figure 5:
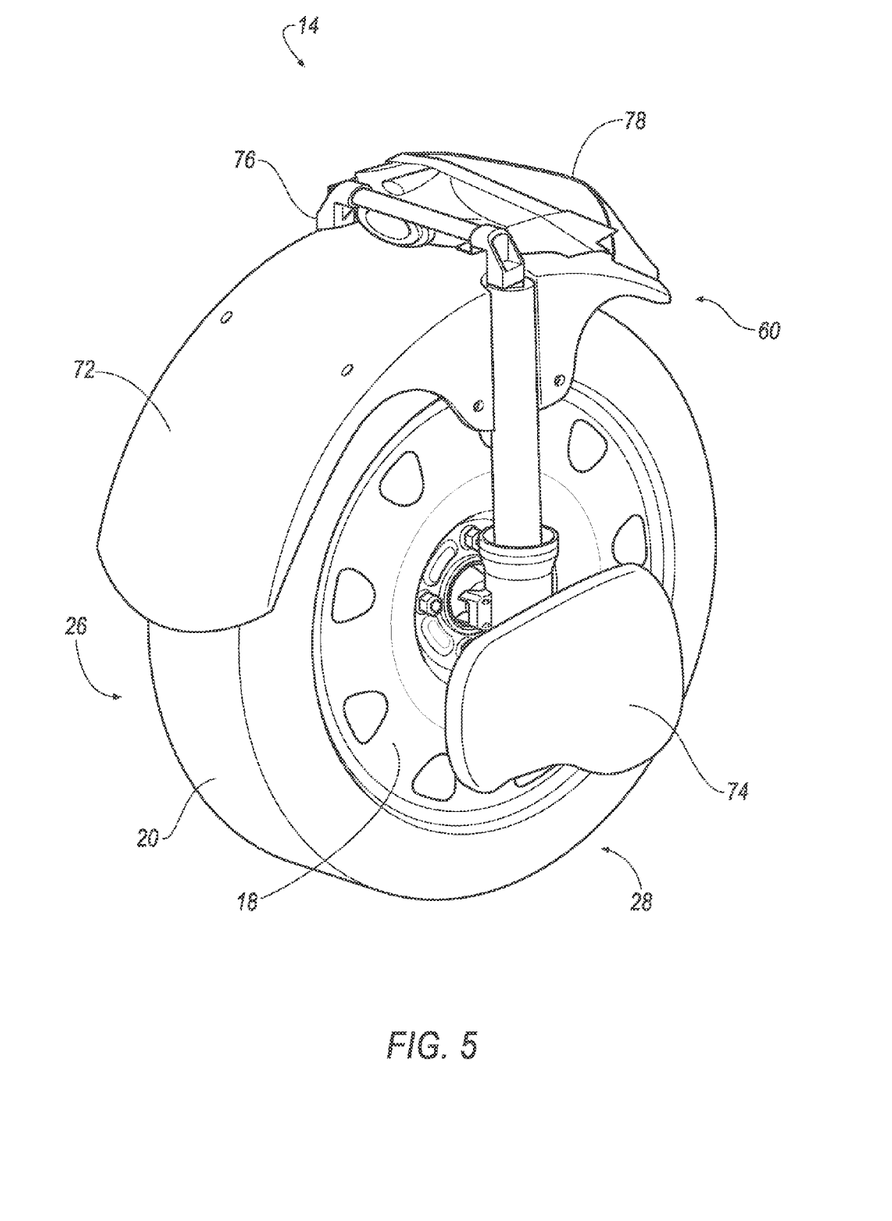
FIG. 5 is a perspective view of a second embodiment of the self-propelled unicycle.
Figure 6:
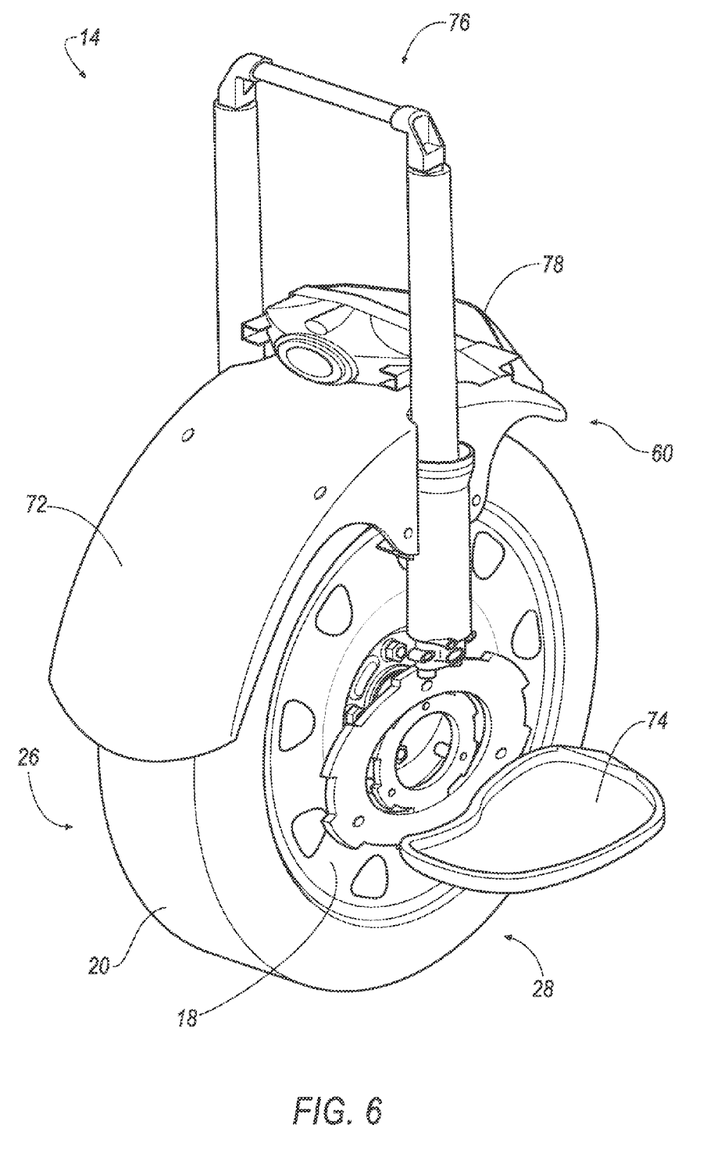
FIG. 6 is a perspective view of the second embodiment of the self-propelled unicycle with footrests unfolded and a handlebar extended.
Figure 7:
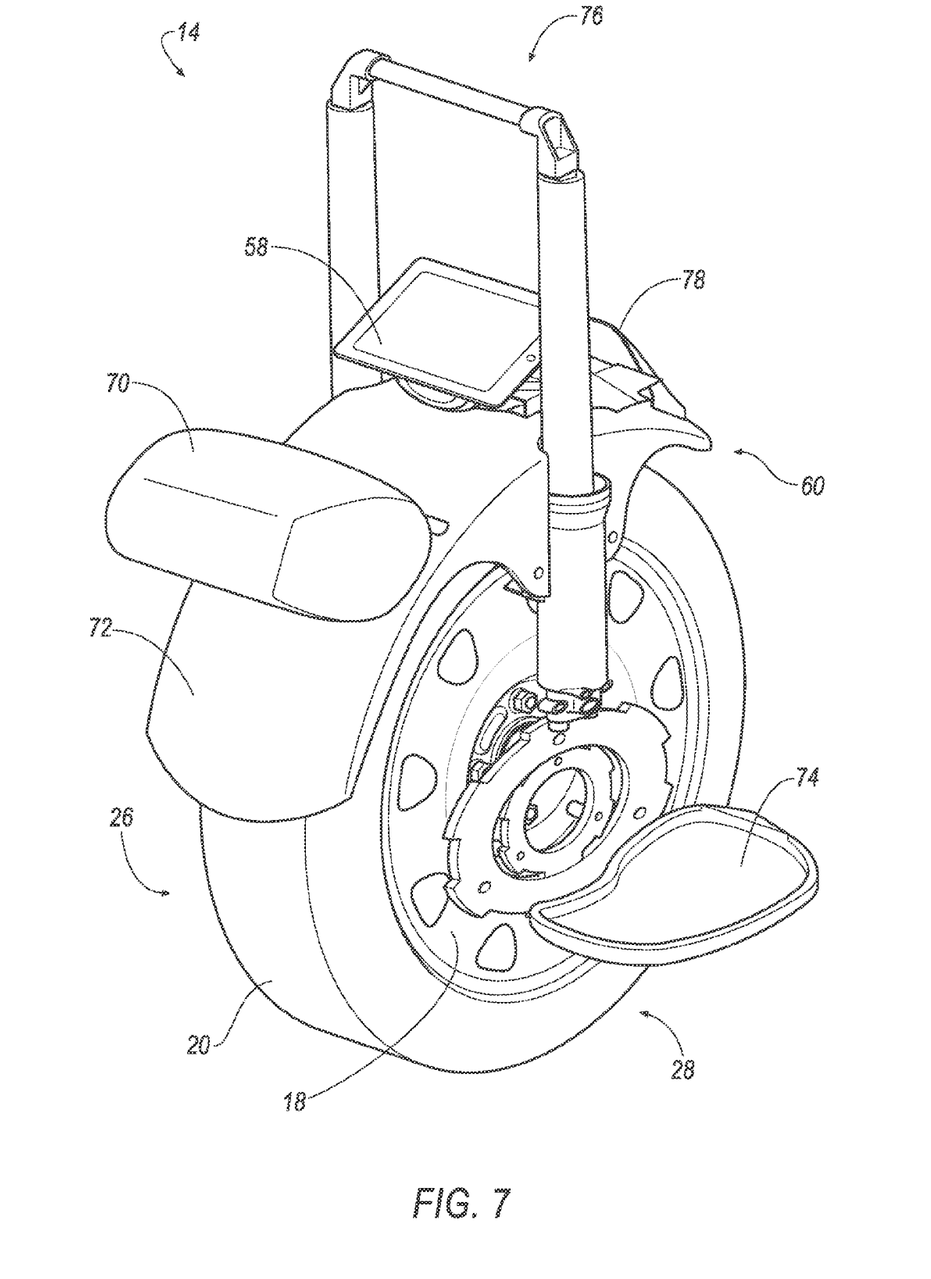
FIG. 7 is a perspective view of the second embodiment of the self-propelled unicycle with a seat back mounted to a fender.

A first embodiment of the self-propelled unicycle 14 is shown for example in FIGS. 1-4 and a second embodiment of the self-propelled unicycle 14 is shown in for example, in FIGS. 5-7. Common features between the two embodiments are discussed below and are identified with common numerals.

Figure 1:
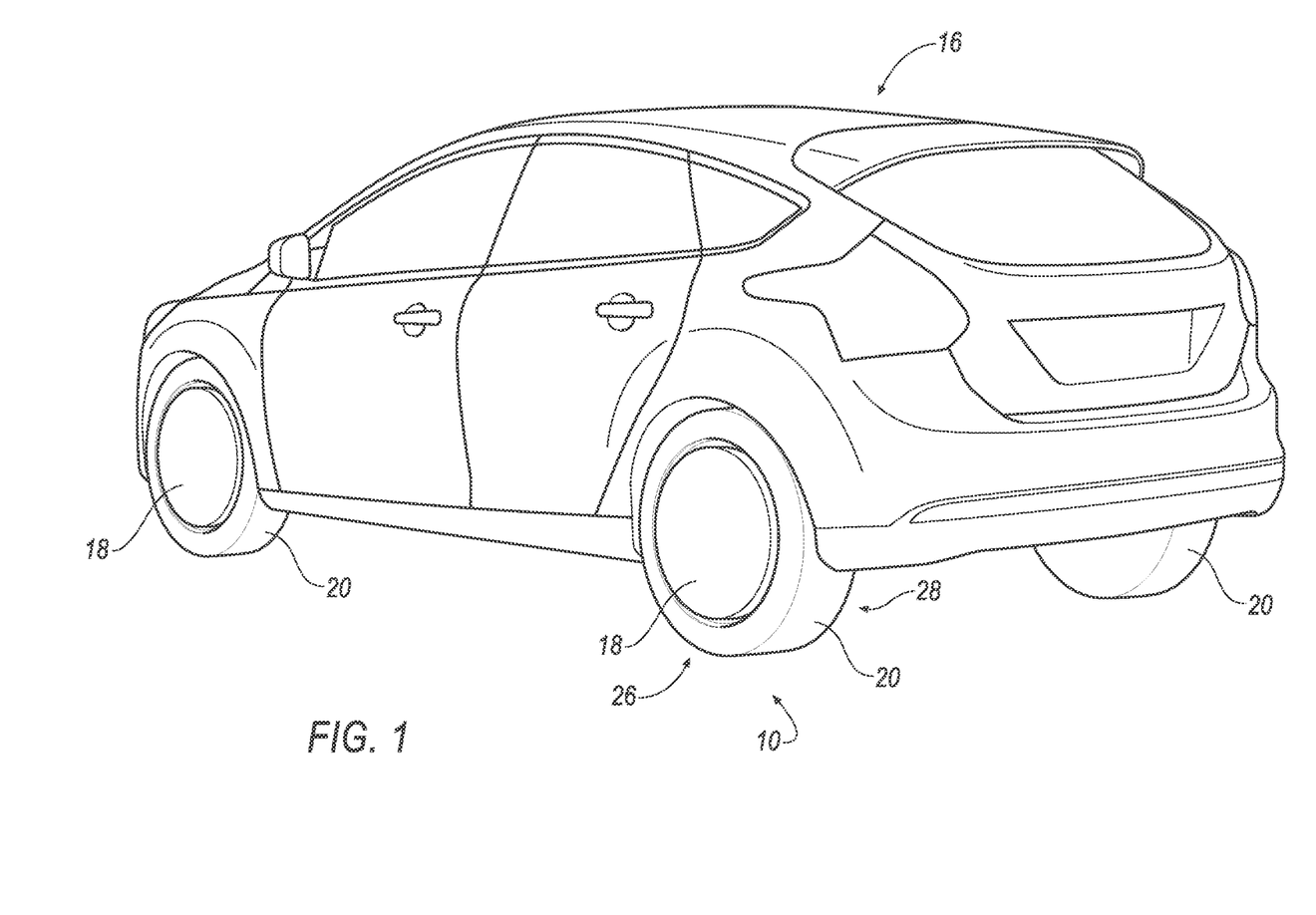
FIG. 1 is a perspective view of a vehicle with four self-propelled unicycles engaged with a suspension system of the vehicle.
Figure 2:
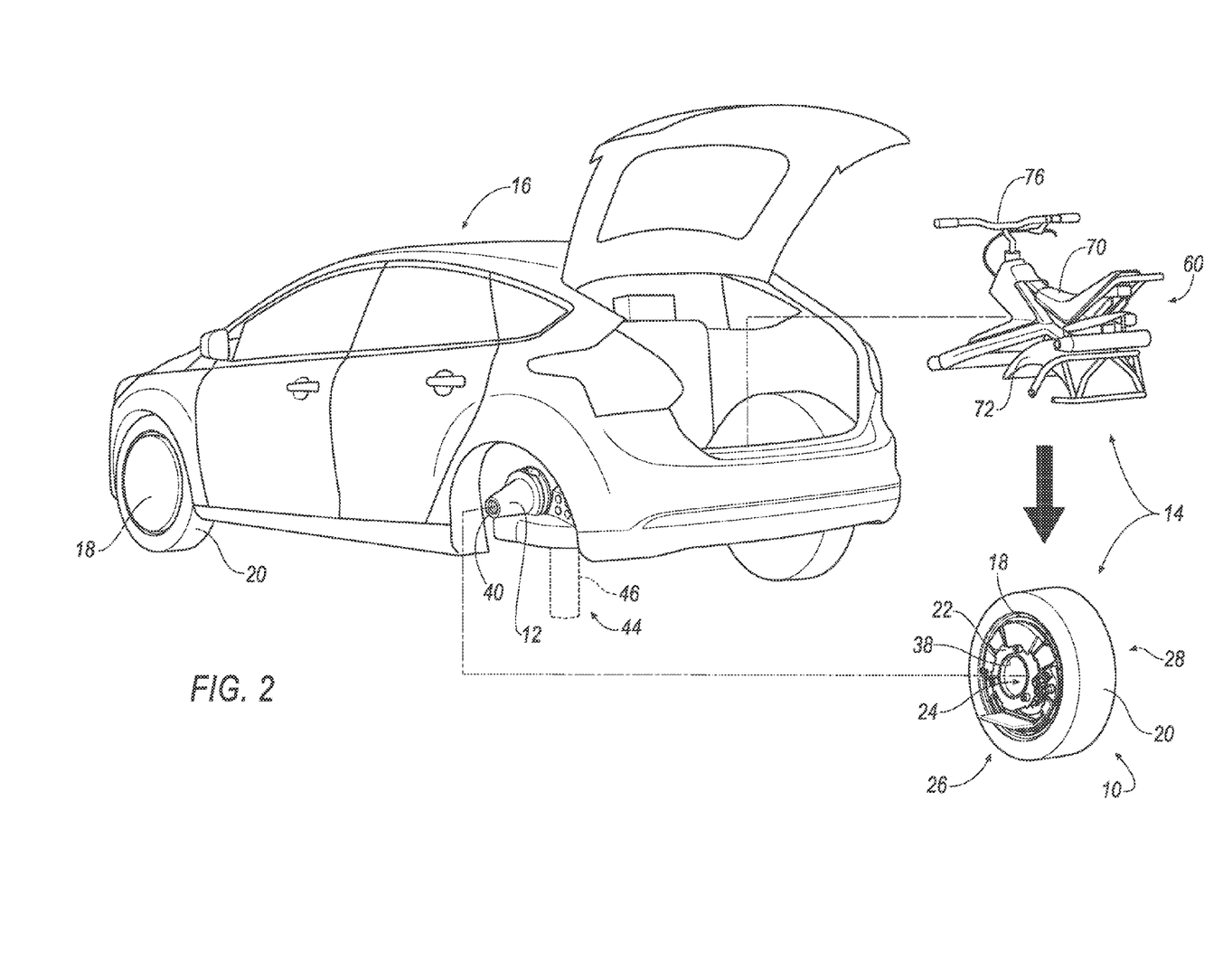
FIG. 2 is a perspective view of one self-propelled unicycle disengaged from the vehicle.

With reference to FIGS. 1-4, the hub 18 includes a first side 26, as shown in FIG. 1, and a second side 28, as shown in FIGS. 2-4. It should be appreciated that the terms "first" and "second" with respect to the first side 26 and second side 28 are identifiers to distinguish between the two sides and should not imply any order or indication of relevant importance. In the configuration shown in the Figures, when the self-propelled unicycle 14 is mounted to the suspension system 12, the first side 26 faces inwardly toward the vehicle 16 and the second side 28 faces outwardly toward an exterior of the vehicle 16.

The engagement feature 24 is disposed on one of the first side 26 and the second side 28 of the hub 18. For example, in the configuration shown in the Figures, the engagement feature 24 is disposed on the first side 26 of the hub 18.

The engagement feature 24 is configured to be removably engaged with the suspension system 12. The engagement feature 24 and corresponding features of the suspension system 12 may be of any suitable type. The suspension system 12 may include an automatic lock 30 controlled by a vehicle-mounted interface 32 for selectively locking with the hub 18, e.g., during operation of the vehicle 16 when the hub 18 is engaged with the suspension system 12. For example, the automatic lock 30 may include a pin 90 that is retractable into and extendable from the suspension system 12, as shown in FIG. 4. In such an embodiment, the hub 18 includes a cavity 92 that receives the pin 90 when the hub 18 is engaged with the suspension system 12 and the pin 90 is extended. The pin 90 may be retracted/extended in any suitable way, such as a pump, motor, etc.

In addition, or in the alternative, to the automatic lock 30, the suspension system 12 may include a manual lock 34. As one example, the manual lock 34 may be center wheel lock 36 and the engagement feature 24 may be a central bore 38 defined by the hub 18 and receiving the center wheel lock 36.

With reference to FIG. 4, the center wheel lock 36 includes a stud 40. The central bore 38 of the hub 18 receives the stud 40 and a fastener 42 engages the stud 40 to fix the hub 18 to the suspension system 12. The stud 40 and the fastener 42 may be threaded to threadedly engage each other. For example, the stud 40 is internally threaded. Alternatively, the stud 40 and the fastener 42 may engage each other in any suitable manner. For example, the suspension system 12 may include an externally threaded stud (not shown) that receives an internally threaded fastener (not shown), or the suspension system 12 may include a stud that receives a quick-release fastener.

The vehicle 16 may include a jack system 44, as shown in FIG. 2. The jack system 44 includes at least one stand 46 that raises the vehicle 16 off the ground to allow the self-propelled unicycle 14 to be engaged with or removed from the vehicle 16. The jack system 44 may lift the entire vehicle 16 off the ground, or alternatively, may lift a portion of the vehicle 16 off the ground. The use of the jack system 44 enables for engagement and disengagement of the self-propelled unicycle 14 without lifting the self-propelled unicycle 14.

The jack system 44 may be integral with the vehicle 16, e.g., with the suspension system 12 or a frame (not shown) of the vehicle 16. In other words, the jack system 44 may be fixed with the suspension system 12 or the frame of the vehicle 16 and may travel with the vehicle 16 on the frame of the vehicle 16 when the vehicle 16 is driven. Alternatively, the jack system 44 may be removable from the suspension system 12 or the frame of the vehicle 16 and stored within the vehicle 16 when not in use. The jack system 44 may be automatically actuated, e.g., with the use of a motor 22, or may be manually actuated, e.g., with the use of a lever manually operated by the driver.

As set forth above, the self-propelled unicycle 14 includes the motor 22. Specifically, the self-propelled unicycle 14 may include more than one motor 22. The motor 22 is supported by the hub 18 and is configured to rotate the wheel 20 relative to the hub 18.

Figure 8:
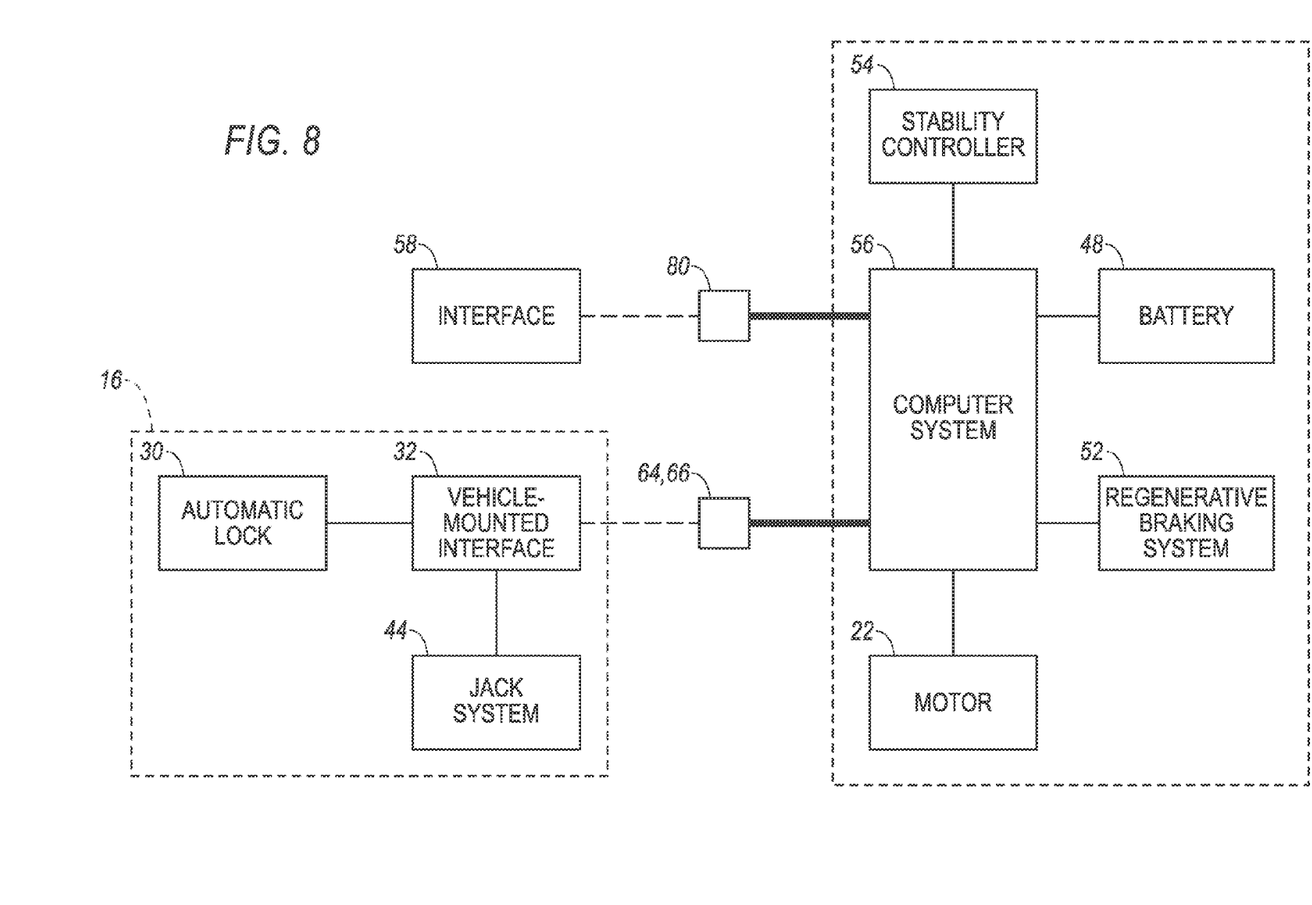
FIG. 8 is a schematic of a computer system of the self-propelled unicycle in selective communication with one of an interface and a vehicle-mounted interface.

The motor 22 may be an electric motor. With reference to FIG. 8, in such a configuration, the self-propelled unicycle 14 includes a battery 48 in communication with the motor 22 for powering the motor 22. The battery 48 is supported by the hub 18. The motor 22 may, alternatively, be any suitable type of motor. The battery 48 may be used to supplement power to a main battery of the vehicle 16.

With reference to FIGS. 3 and 4, the self-propelled unicycle 14 may include an electrical connector 50 supported by the hub 18 for connecting to a power source other than the vehicle 16. For example, the electrical connector 50 may be a plug that connects to a wall outlet at a location remote from the vehicle 16 for recharging the battery 48. The self-propelled unicycle 14 may include solar cells for collecting energy and recharging the battery 48. The battery 48 may be, for example, a lithium ion battery, a carbon or dual carbon battery, etc.

With reference to FIG. 8, in the configuration where the motor 22 is electric, the self-propelled unicycle 14 may include a regenerative braking system 52 configured to convert kinetic energy of relative motion between the wheel 20 and the hub 18 into electricity when the self-propelled unicycle 14 is slowed. In such a configuration, the motor 22 may act as a generator for converting the kinetic energy into electricity. The electricity may be formed stored in the battery 48.

The self-propelled unicycle 14 may be configured to propel the vehicle 16. Specifically, the hub 18 is fixed to the suspension system 12 and the motor 22 may rotate the wheel 20 relative to the hub 18 to propel the vehicle 16. Since the hub is connected to the suspension system 12 on the first side 26 of the hub 18, the hub 18 delivers force from the wheel 20 to the suspension system 12 as the wheel 20 rotates relative to the hub 18 to propel the vehicle 16.

The self-propelled unicycle 14 may be used in addition to, or in the alternative to, a motor of the vehicle 16. In other words, the self-propelled unicycle 14 may be used to fully propel the vehicle 16 without the need for a traditional motor, such as a gasoline powered or electric motor, of the vehicle 16. In another configuration, the vehicle 16 may include a traditional motor such that the traditional motor and the self-propelled unicycle 14 may be alternately used to propel the vehicle 16. Alternatively, the self-propelled unicycle 14 may be used to support the vehicle 16 without propelling the vehicle 16, e.g., a traditional motor of the vehicle 16 propels the vehicle 16 and the self-propelled unicycle 14 supports the vehicle 16 during propulsion.

With reference to FIG. 8, the self-propelled unicycle 14 may include a stability controller 54 for maintaining the self-propelled unicycle 14 in a desired orientation for supporting the driver. The stability controller 54 may include one or more gyroscopes for measuring and maintaining the desired orientation.

With continued reference to FIG. 8, the self-propelled unicycle 14 includes a computer system 56 for controlling features of the self-propelled unicycle 14 and/or recording data from the self-propelled unicycle 14, such as operating data, environmental data, etc. The computer system 56, for example, controls the stability controller 54. For example, the computer system 56 may control settings of the stability controller 54 to operate the self-propelled unicycle 14 in various modes, e.g., beginner rider mode, intermediate rider mode, experienced rider mode, sport mode, etc. The computer system 56 may also control other features of the self-propelled unicycle 14 such as lights, theft deterrent features, etc. The computer system 56 may also monitor conditions of the self-propelled unicycle 14 such as battery life, maintenance schedules, etc.

With reference to FIGS. 3 and 7, the self-propelled unicycle 14 may include an interface 58 for operating the computer system 56 when the self-propelled unicycle 14 is disengaged from the suspension system 12. The interface 58 may include a screen for displaying information and input features, e.g., a graphical user interface, buttons, dials, etc., for inputting information into the computer system 56.

The interface 58 may be removably engageable with the self-propelled unicycle 14. For example, the interface 58 and a body 60 of the self-propelled unicycle 14 may include corresponding electrical and/or data connectors 80, such as jacks, plugs, receptacles, etc., that engage with each other when the interface 58 is engaged with the body 60. The body 60 may define a retention feature, such as a shelf, clips, etc., for supporting the interface 58. The interface 58 may be, for example, a laptop computer, a smart mobile phone, a tablet, etc. In the configuration where the interface 58 is a laptop computer, the battery of the laptop computer may be used to power the motor 22.

With reference to FIG. 8, the vehicle 16 may include a vehicle-mounted interface 32 for operating the computer system 56 when the self-propelled unicycle 14 is engaged with the suspension system 12. The vehicle-mounted interface 32 may be, for example, an Interactive Command Cluster (ICC) of the vehicle 16. The ICC of the vehicle 16 may include, for example, an interactive screen in communication with a computer of the vehicle 16 for monitoring and adjusting various parameters of the performance, entertainment features, etc., of the vehicle 16.

When the self-propelled unicycle 14 is engaged with the suspension system 12, the vehicle-mounted interface 32 may communicate with the computer system 56 of the self-propelled unicycle 14 to monitor speed and distance of travel of the self-propelled unicycle 14 during independent use, life of the battery 48, etc. The ICC may visually display these measurements and may include input features for selectively displaying information from the computer system 56 of the self-propelled unicycle 14 and/or inputting information into the computer system 56 of the self-propelled unicycle 14.

With reference to FIGS. 3 and 4, the suspension system 12 of the vehicle 16 and the hub 18 of the self-propelled unicycle 14 each include an electrical connector 64, e.g., a plug and socket, configured to engage each other when the self-propelled unicycle 14 is engaged with the suspension system 12. The vehicle 16 may charge the battery 48 of the self-propelled unicycle 14 through the electrical connectors 64 when the self-propelled unicycle 14 is engaged with the suspension system 12. Specifically, a battery of the vehicle 16 may be used to charge the battery 48 of the self-propelled unicycle 14.

With continued reference to FIGS. 3 and 4, the suspension system 12 of the vehicle 16 and the hub 18 of the self-propelled unicycle 14 each may include a data connector 66, e.g., a plug and socket, configured to engage each other when the self-propelled unicycle 14 is engaged with the suspension system 12. When the data connectors 66 are engaged, the vehicle-mounted interface 32 is in communication with the computer system 56 of the self-propelled unicycle 14 to communicate with the computer system 56 of the self-propelled unicycle 14, as set forth above. The suspension system 12 of the vehicle 16 and the hub 18 of the self-propelled unicycle 14 each may include cooling lines connectors 68 that connect cooling lines from the vehicle 16 to a cooling system of the self-propelled unicycle 14.

When the self-propelled unicycle 14 is engaged with the suspension system 12, the vehicle 16 may control the computer system 56 of the self-propelled unicycle 14. For example, acceleration and braking of the self-propelled unicycle 14, i.e., speed of the motor 22, may be controlled by operation of a throttle pedal, i.e., gas pedal, and brake pedal of the vehicle 16.

With reference to FIGS. 2-3 and 5-7, the self-propelled unicycle 14 includes the body 60 for supporting the driver on the hub 18 and the wheel 20. The body is supported by the hub 18. The body 60 may include a seat 70 for the driver to sit on. The stability controller 54, for example, is configured to retain the seat 70 in an upright position when the self-propelled unicycle 14 is driven. The body 60 may include a fender 72 connected to the seat 70 for deflecting splash and debris raised by the wheel 20.

As described further below, the self-propelled unicycle 14 may include footrests 74 for supporting the feet of the driver. The footrests 74 may be part of the body 60.

As described further below, the self-propelled unicycle 14 may include the handlebar 76. The driver may grip the handlebar 76 while the self-propelled unicycle 14 is driven.

The self-propelled unicycle 14 may include one or more additional wheels (not shown) in addition to the hub 18/wheel 20. The additional wheel may be pedal driven, e.g., for selectively propelling the self-propelled unicycle 14 without the use of the motor 22, or may be passive. The additional wheel may provide extra stability, for example, for use on unpredictable road conditions or beginner/unconfident riders who need extra assurance. In other words, the one or more additional wheels may act as training wheels.

The self-propelled unicycle 14 may include a headlight 78. Operation of the headlight 78 may, for example, be controlled by the interface 58.

In operation, the user parks the vehicle 16 at a desired location. The vehicle-mounted interface 32 may then automatically provide the option to access the self-propelled unicycle 14. If the driver chooses not to access the self-propelled unicycle 14, the driver may walk away from the vehicle 16, start the vehicle 16 and drive further, etc.

If the driver chooses to access the self-propelled unicycle 14, the driver may further interact with the vehicle-mounted interface 32 to select operating conditions of the self-propelled unicycle 14. The driver may activate the jack system 44 through the vehicle-mounted interface 32 to raise the vehicle 16 off the ground to access the self-propelled unicycle 14. The vehicle 16 may be locked from operation when the vehicle 16 is raised off the ground by the jack system 44.

Before or after the jack system 44 is activated, in the configuration where the suspension system 12 includes the automatic lock 30, the automatic lock 30 on the suspension system 12 may be unlocked to unlock the hub 18 from the suspension system 12. In the configuration where the suspension system 12 includes a manual lock 34, the manual lock 34 may be manually unlocked, e.g., the fastener 42 may be removed from the stud 40 before or after the jack system 44 is activated.

As the self-propelled unicycle 14 is removed from the vehicle 16, the driver disengages the electrical connectors 64 and the data connectors 66. The driver may then connect the interface 58 to the body 60 of the self-propelled unicycle 14. The driver may then drive the self-propelled unicycle 14 to a location remote from the vehicle 16.

With reference to FIGS. 1-4, the body 60 of the first embodiment of the self-propelled unicycle 14 may be removable from the hub 18. When removed from the hub 18, the body 60 may be stored in the vehicle 16, for example. The footrest and the handlebar may be supported on the body 60. The body 60 may be engaged and disengaged with the hub 18 with any suitable mechanism.

After the self-propelled unicycle 14 is removed from the suspension system 12, the body 60 is engaged with the hub 18. The self-propelled unicycle 14 may then be operated independently from the vehicle 16.

When the driver returns to the vehicle 16 on the self-propelled unicycle 14, the driver may remove the body 60 from the hub 18 and store the body 60 on the vehicle 16. The driver then engages the hub 18 of the self-propelled unicycle 14 with the suspension system 12 of the vehicle 16, at which time the driver may enter and drive the vehicle 16.

With reference to FIGS. 5-7, the body 60 of the second embodiment of the self-propelled unicycle 14 remains engaged with the hub 18 when the self-propelled unicycle 14 is engaged with the suspension system 12. The footrests 74 may be pivotably coupled to the rest of the body 60 such that the footrests 74 may be folded when the self-propelled unicycle 14 is engaged with the suspension system 12 and unfolded when the self-propelled unicycle 14 is disengaged with the suspension system 12. The handlebar 76 may be telescopically engaged with the rest of the body 60 so that the handlebar 76 may be recessed when the self-propelled unicycle 14 is engaged with the suspension system 12 and may be extended when the self-propelled unicycle 14 is disengaged with the suspension system 12. With reference to FIG. 8, a headrest of the vehicle 16 may be removably assembled to the fender 72 to operate as the seat 70.

When reference to FIGS. 5-7, after the self-propelled unicycle 14 is removed from the suspension system 12, the footrests 74 are unfolded and the handlebar 76 is extended. The self-propelled unicycle 14 may then be operated independently from the vehicle 16.

When the driver returns to the vehicle 16 on the self-propelled unicycle 14, the driver may fold the footrests 74 and recess the handlebar 76. The driver then engages the hub 18 of the self-propelled unicycle 14 with the suspension system 12 of the vehicle 16, at which time the driver may enter and drive the vehicle 16.

The disclosure has been described in an illustrative manner, and it is to be understood that the terminology which has been used is intended to be in the nature of words of description rather than of limitation. Many modifications and variations of the present disclosure are possible in light of the above teachings, and the invention may be practiced otherwise than as specifically described.

What is claimed is:

1. A multi-modal transportation system comprising:
a suspension system for a vehicle; and
a self-propelled unicycle for selectively engaging the suspension system for use with the vehicle and selectively disengaging the suspension system for independent use;
the self-propelled unicycle including a hub, a wheel rotatably coupled to the hub, and a motor coupled to the hub and the wheel for rotating the wheel;
the hub including a central bore for selectively engaging the suspension system;
wherein the suspension system includes a center wheel lock and wherein the central bore receives the center wheel lock.

2. The system as set forth in claim 1 wherein the hub includes a first side and a second side and footrests coupled to the first side and the second side.

3. The system as set forth in claim 2 wherein the central bore is disposed on one of the first side and the second side of the hub.

4. The system as set forth in claim 1 wherein the motor is supported by the hub.

5. The system as set forth in claim 1 wherein the suspension system and the hub each include an electrical connector configured to engage each other when the self-propelled unicycle is engaged with the suspension system.

6. The system as set forth in claim 1 wherein the self-propelled unicycle includes a computer system for controlling features of the self-propelled unicycle.

7. The system as set forth in claim 6 further comprising an interface on the self-propelled unicycle for operating the computer system when the self-propelled unicycle is disengaged from the suspension system.

8. The system as set forth in claim 7 wherein the interface is removably engageable with the self-propelled unicycle.

9. The system as set forth in claim 7 further comprising a vehicle-mounted interface for operating the computer system when the self-propelled unicycle is engaged with the suspension system.

10. The system as set forth in claim 1 wherein the motor is an electric motor and the self-propelled unicycle includes a battery in communication with the motor.

11. The self-propelled unicycle as set forth in claim 1 wherein the motor is an electric motor and the self-propelled unicycle includes a battery in communication with the motor.

12. A self-propelled unicycle for selectively engaging a vehicle for use with the vehicle and selectively disengaging the vehicle for independent use, the self-propelled unicycle comprising:
a hub;
a wheel rotatably coupled to the hub; and
a motor supported on the hub and coupled to the wheel for rotating the wheel;
the hub including a central bore configured to receive a wheel lock of a suspension system of the vehicle for selectively engaging and disengaging the vehicle.

13. The self-propelled unicycle as set forth in claim 12 wherein the hub includes a first side and a second side and footrests coupled to the first side and the second side.

14. The self-propelled unicycle as set forth in claim 13 wherein the central bore is disposed on one of the first side and the second side of the hub.

15. The self-propelled unicycle as set forth in claim 12 wherein the motor is supported by the hub.

16. The self-propelled unicycle as set forth in claim 12 wherein the hub includes an electrical connector configured to engage an electrical connector on the vehicle when the self-propelled unicycle is engaged with the vehicle.

17. The self-propelled unicycle as set forth in claim 12 further comprising a computer system for controlling features of the self-propelled unicycle.

18. The self-propelled unicycle as set forth in claim 17 further comprising an interface connectable to the computer system for operating the computer system when the self-propelled unicycle is disengaged from the suspension system.

19. The self-propelled unicycle as set forth in claim 18 wherein the interface is removably connectable to the computer system.

20. A multi-modal transportation system comprising:
a vehicle suspension system; and a self-propelled unicycle including a hub, a wheel rotatably coupled to the hub, and a motor coupled to the hub and the wheel;

the vehicle suspension system including a wheel lock, and the hub including a bore removeably engaging the wheel lock for selectively engaging the self-propelled unicycle to the vehicle suspension system.

\* \* \* \* \*